W. A. KNOYER.
COAL WASHING APPARATUS.
APPLICATION FILED JAN. 17, 1908.
906,239.
Patented Dec. 8, 1908.
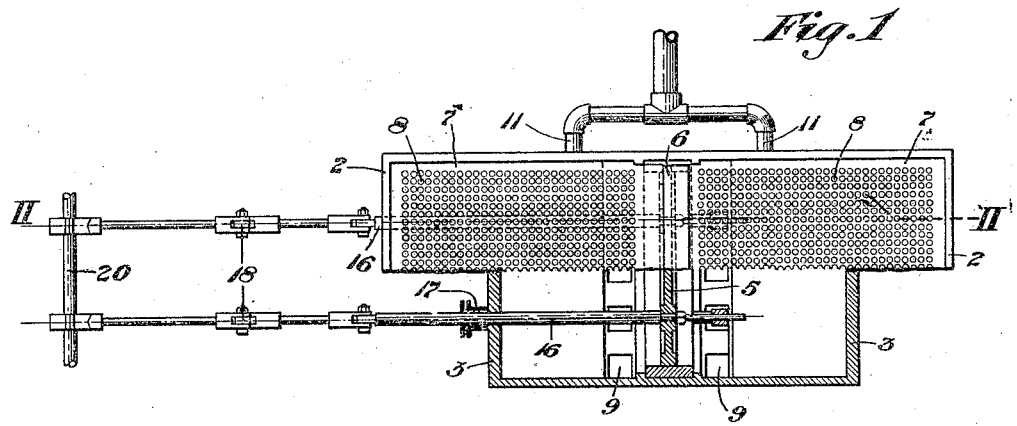
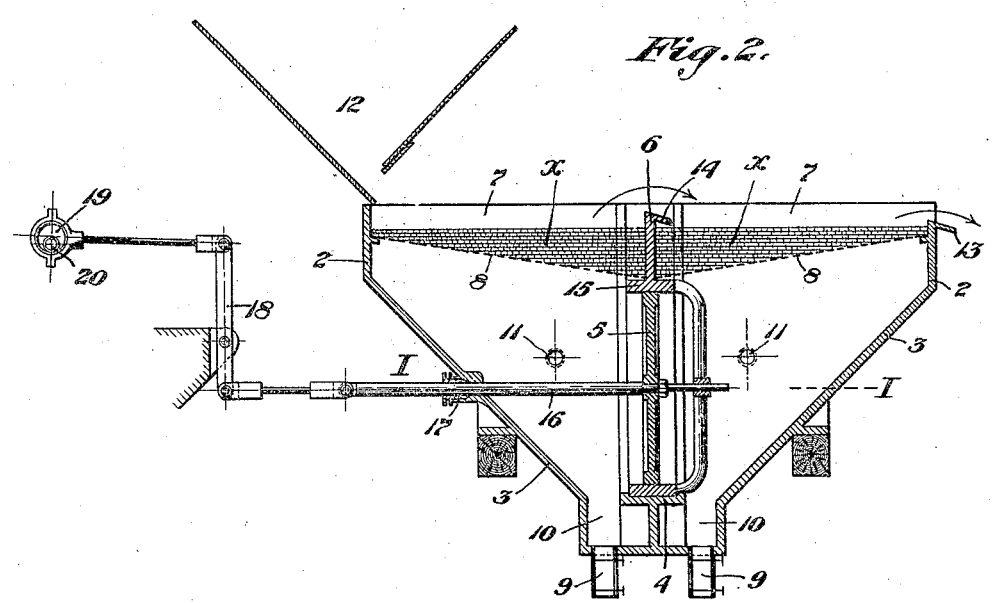
Witnesses:
Chas. S. Pepley.
Fred Stout.
Inventor:
William A. Knoyer
by C. M. Clarke
his attorney

UNITED STATES PATENT OFFICE.

WILLIAM A. KNOYER, OF MASONTOWN, PENNSYLVANIA, ASSIGNOR TO PITTSBURG COAL WASHER COMPANY, OF PITTSBURG, PENNSYLVANIA, A CORPORATION OF PENNSYLVANIA.

COAL-WASHING APPARATUS.

No. 906,239.

Specification of Letters Patent.

Patented Dec. 8, 1908.

Application filed January 17, 1908. Serial No. 411,251.

*To all whom it may concern:*

Be it known that I, WILLIAM A. KNOYER, a citizen of the United States, residing at Masontown, in the county of Fayette and State of Pennsylvania, have invented certain new and useful Improvements in Coal-Washing Apparatus, of which the following is a specification, reference being had therein to the accompanying drawing.

My invention refers to improvements in washing apparatus for coal or other minerals for the separation of impurities by gravity and the buoyant effect of water, and relates particularly to an improved construction of jig and the current producing mechanism therein.

Referring to the drawings, Figure 1 is a plan view, partially in horizontal section on the line I—I, of Fig. 2 of my improved apparatus. Fig. 2 is a vertical sectional view on the line II—II of Fig. 1.

The apparatus comprises a jig tank 2, preferably rectangular in form, having inwardly and downwardly sloping ends 3, 3, and a middle transverse partition framework 4 in which is mounted a reciprocating plunger 5. Extending upwardly beyond the partition 4, which constitutes a plunger housing, is a transverse partition 6, arranged to divide the upper portion of the tank in two equal burden-containing compartments 7, 7, of substantially the same size and capacity.

The upper portion of the tank cavity is divided from the main lower portion by transversely arranged screens 8, 8, of perforated plate metal, wire netting, or other suitable construction, adapted to support the mineral to be washed and to provide for free upward travel of the water.

In use the screens 8, which are preferably arranged at a slight angle as shown, are covered with a layer of feldspar or other suitable material $x$ of sufficient specific gravity to rest upon the perforated screens 8, preventing the downward passage of the finer particles of the coal or other light minerals while permitting of free upward circulation of the water under the impulses imparted to it by plunger 5, and of downward passage of the heavier impurities.

The particular advantage of inclining the screens 8 downwardly towards the middle partition 6 at each side is that the depth of the ragging $x$ thus increases gradually from the outer end of each screen towards its inner end. As the pulsations of the water are stronger adjacent to the plunger 5 and gradually decrease in force in proportion to the distance therefrom, the graduated thickness of the ragging bed results in an even up-flow of the water therethrough all over with resulting uniformity in the separation of the coal from its impurities. I also prevent the lighter impurities from being carried over with the fine particles of washed coal by violent disturbance of the water at any point.

9, 9, represent any suitable slate gates or outlets for the accumulated impurities which pass downwardly through the screen and accumulate in the terminal boxes 10, 10, at the bottom of the tank, and which may be emptied from time to time.

Water is supplied to the interior of the tank by pipes 11, 11, leading from any suitable source of supply, while the coal or other mineral to be washed is discharged into the jig from a hopper or other source of supply 12, preferably located at one end. The circulation of the washed coal is indicated by the arrows, the opposite end of the jig tank being somewhat lower than the inlet end, thereby causing the coal to travel outwardly along the entire length of the jig during the washing operation, thus effecting thorough separation of the impurities, before the washed coal is finally discharged. The outlet end of the jig, and also the middle partition 6, may be provided with forwardly extending lips or flanges 13, 14, as shown.

The plunger 5, which may be of any desired form in cross section, is mounted within a lining 15 forming a portion of or incorporated with the transverse framework 4, the plunger 5 being so mounted therein as to make a substantially fluid-tight joint.

Motion is imparted to plunger 15 by one or more rods 16, preferably two, passing outwardly through stuffing boxes 17 in the ends of the tank, and actuated through any suitable lever mechanism and connections 18, from eccentric or cam mechanism 19 on shaft 20.

The mechanism as thus constructed is adapted to operate somewhat rapidly, say one hundred and eighty-five strokes per minute, the strokes being comparatively short say one-half to one and one-quarter inches in length, depending on local conditions or other factors and by these means it will be seen that a constant series of impulses will be imparted to the water within each end compartment of the tank, resulting in a practically constant upwardly pulsating flow through the screens 8 and their sustained burden, to effect the desired separation.

I have found in practice that by imparting to the coal a continuous series of rapid pulsations, effecting a constant intermittent flow of water under pressure, the finer particles of coal and impurities may be very thoroughly separated, due to the gentle continuous agitation of the intermittent upwardly traveling current. This result is due to the comparatively short strokes and high velocity of the plunger, operating alternately on the oppositely located bodies of water beneath the screen, whereby two continuous currents are forced upwardly to effect the washing operation.

It will be understood that the number and extent of the strokes may be varied to suit the character of the coal or other mineral, also that the slope of the screens 8 may be changed, or that other changes or variations may be made by the skilled mechanic without departing from the scope of the following claims:

What I claim and desire to secure by Letters Patent is:

1. A coal washing apparatus comprising a single tank with a middle transversely arranged partition terminating below the top of the tank, a reciprocating plunger below said partition arranged to act alternately on the contents of the tank to carry the coal over the partition and outwardly from the end, perforated screens arranged across the upper portion of the tank at each side of the partition and inclining downwardly toward said partition at each side, means for supplying water to each compartment of the tank below the screens, and means for actuating the plunger, substantially as set forth.

2. A coal washing apparatus comprising a single tank with a middle transversely arranged partition terminating below the top of the tank, a reciprocating plunger below said partition arranged to act alternately on the contents of the tank to carry the coal over the partition and outwardly from the end, perforated screens arranged across the upper portion of the tank at each side of the partition and inclining downwardly toward said partition at each side, means for supplying water to each compartment of the tank below the screens, means for actuating the plunger, and means for withdrawing the impurities from the lower portion of each compartment, substantially as set forth.

3. A coal washing apparatus comprising a single tank with a middle transversely arranged partition terminating below the top of the tank, a reciprocating plunger below said partition arranged to act alternately on the contents of the tank to carry the coal over the partition and outwardly from the end, perforated screens arranged across the upper portion of the tank at each side of the partition and inclining downwardly toward said partition at each side, means for supplying water to each compartment of the tank below the screens, and means for actuating the plunger, said tank having an overflow conduit at one end between the sides of the tank, substantially as set forth.

4. In a coal washing apparatus, the combination of a tank having an outlet opening for the water and washed material at one end and inwardly sloping oppositely inclined bottoms at each end, a transverse over-flow partition midway between the ends extending upwardly to a short distance below the top of the tank and having a lip extending toward the outlet opening, said partition being provided with a plunger housing through its middle portion, transversely arranged screens extending across the upper portion of the tank and inclining downwardly toward the middle partition, means for supplying water below said screens at each side of said partition, and a reciprocating plunger mounted in said housing, with means for actuating it, substantially as set forth.

5. In a coal washing apparatus, the combination of a tank having an outlet opening for the water and washed material at one end and inwardly sloping oppositely inclined bottoms at each end, a transverse over-flow partition midway between the ends extending upwardly to a short distance below the top of the tank and having a lip extending toward the outlet opening, said partition being provided with a plunger housing through its middle portion, transversely arranged screens extending across the upper portion of the tank and inclining downwardly toward the middle partition, means for supplying water below said screens at each side of said partition, a reciprocating plunger mounted in said housing, with means for actuating it, means for supplying coal to the end of the tank opposite the over-flow conduit, and means for withdrawing the impurities from the bottom of the tank at each side of the partition, substantially as set forth.

6. A coal washing apparatus comprising a single tank with a transversely arranged over-flow partition terminating below the top of the tank, said tank having means for supplying coal to one end of the tank and an out-flow conduit at the other end of the tank, a plunger housing located in said partition, a reciprocating plunger mounted therein, means for actuating the plunger, perforated screens arranged across the upper portion of the tank at each side of the partition and inclining downwardly toward it at each side, and means for supplying water to each compartment of the tank below the screens, substantially as set forth.

In testimony whereof I affix my signature in presence of two witnesses.

WM. A. KNOYER.

Witnesses:
HARRY CORY,
JOS. RAFAEL.